United States Patent
Mutalikdesai et al.

(10) Patent No.: US 11,849,342 B2
(45) Date of Patent: Dec. 19, 2023

(54) GLOBAL AND LOCAL MEASURES OF CENTRALITY FOR SIGNED AND UNSIGNED NETWORKS

(71) Applicant: International Business Machines Corporation, Armonk, NY (US)

(72) Inventors: Mandar Mutalikdesai, Bengaluru (IN); Ashish Rao, Bangalore (IN); Kartikeya Vats, Dehradun (IN); Sheetal Srivastava, Bengaluru (IN); Sandipto Neogi, Bangalore (IN); Ojasvi Bhalerao, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 17/113,822

(22) Filed: Dec. 7, 2020

(65) Prior Publication Data

US 2022/0182857 A1   Jun. 9, 2022

(51) Int. Cl.
*H04W 24/08*   (2009.01)

(52) U.S. Cl.
CPC .................. *H04W 24/08* (2013.01)

(58) Field of Classification Search
CPC .................................................. H04W 24/08
See application file for complete search history.

(56) References Cited

U.S. PATENT DOCUMENTS

| | | | |
|---|---|---|---|
| 10,121,115 B2 | 11/2018 | Chrapko | |
| 10,311,106 B2 * | 6/2019 | Chrapko | G06Q 50/01 |
| 2009/0040931 A1 * | 2/2009 | Bast | G01C 21/3446 370/238 |
| 2017/0351740 A1 * | 12/2017 | Narayanam | G06F 16/2465 |
| 2020/0004752 A1 | 1/2020 | Majumdar et al. | |
| 2020/0089874 A1 | 3/2020 | Abbaszadeh et al. | |

OTHER PUBLICATIONS

Derr et al., "Signed Node Relevance Measurements", arXiv:1710.07236v2 [cs.SI] Oct. 25, 2017, 10 pages.

(Continued)

*Primary Examiner* — Abdeltif Ajid
(74) *Attorney, Agent, or Firm* — Mark Bergner (57) ABSTRACT

A method and related system determine a localness measure that represents accessibility of a node connectiveness within a signed network. The method comprises, with a computer processor, receiving focus node (FN) information related to an FN of a graph representing the signed network, receiving neighbor node (NN) information related to a plurality of NNs in the signed network, and determining the localness measure based on the NN information and the FN information. The method and system also determine a harmony measure that represents importance of a node connectiveness within a signed network. The method comprises, with a computer processor, receiving source node (SN) information related to an SN of a graph representing the signed network, receiving destination node (DN) information related to a DN in the signed network, and determining the harmony measure based on the SN information and the DN information.

12 Claims, 6 Drawing Sheets

(56) References Cited

OTHER PUBLICATIONS

Jung et al., "Personalized Ranking in Signed Networks using Signed Random Walk with Restart", 2016 IEEE 16th International Conference on Data Mining, pp. 973-978, DOI 10.1109/ICDM.2016.140.
Mishra et al., "Finding the Bias and Prestige of Nodes in Networks based on Trust Scores", WWW 2011—Session: Social Network Analysis, Mar. 28-Apr. 1, 2011, Hyderabad, India, pp. 567-576.
Gangal, V., et al., "Trust and Distrust Across Coalitions—Shapley Value Centrality Measures for Signed Networks", 8 pages.
Bonacich, Phillip, Some Unique properties of Eigenvector Centrality, Social Networks, vol. 29, Issue 4, pp. 555-564, Oct. 2007.
Page et al., "The PageRank Citation Ranking: Bringing Order to the Web", Technical Report, 2 pages, Stanford Info Lab, 1999, found at: http://ilpubs.stanford.edu:8090/422/.
Li et al., "Positive influence maximization in signed social networks based on simulated annealing", Neurocomputing vol. 260, pp. 69-78, Oct. 18, 2017.
Estevez, Pablo A. et al., "Selecting the Most Influential Nodes in Social Networks", 7 pages, Proceedings of International Joint Conference on Neural Networks, Orlando, Florida, USA, Aug. 12-17, 2007.
Zolfaghar et al., "Mining trust and distrust relationships in social Web applications," Proceedings of the 2010 IEEE 6th International Conference on Intelligent Computer Communication and Processing, Cluj-Napoca, 2010, pp. 73-80, doi: 10.1109/ICCP.2010.5606460, downloaded on Aug. 17, 2020 from IEEE Xplore.
Bonacich et al., "Calculating status with negative relations", Elsevier, Social Networks, vol. 26, Issue 4, Oct. 2004, pp. 331-338.
"Centrality", WikipediA, Definition, 19 pages.
"Betweenness centrality", WikipediA, Definition, 6 pages.
Kunegis, J. et al., The Slashdot Zoo: Mining a Social Network with Negative Edges, 10 pages, 2009.
Li, D. et al., "Polarity Related Influence Maximization in Signed Social Networks", PLoS One, 25 pages, doi: 10.1371/journal.pone.0102199, Jul. 25, 2014.
Tang, J. et al., "A Survey of Signed Network Mining in Social Media", ACM Computing Surveys, vol. 9, No. 4, Article 39, Publication date: Mar. 2014.
Wu et al., "The TrollTrust Model for Ranking in Signed Networks", 10 pages, WSDM2016, 2016, San Francisco, 2016.
Mell, P. et al., "The NIST Definition of Cloud Computing", Recommendations of the National Institute of Standards and Technology, NIST Special Publication 800-145, 7 pages, Sep. 2011.

\* cited by examiner

GLOBAL AND LOCAL MEASURES OF CENTRALITY FOR SIGNED AND UNSIGNED NETWORKS

BACKGROUND

Disclosed herein is a system and related method for determining global and local measures of centrality for signed and unsigned networks.

There exist several approaches for defining locality of a node in networks—however, they apply only to unsigned networks. There are also some methods to detect communities in signed networks as well as unsigned networks. However, the problem of detecting communities is different from that of determining the localness of a node. Community detection is similar to clustering, where similar nodes are grouped under one class/community—but it does not matter how proximal these nodes are to each other in such measurements.

SUMMARY

According to one aspect disclosed herein, a computer-implemented method is provided to determine a localness measure that represents accessibility of a node connectiveness within a signed network. The method comprises, with a computer processor, receiving focus node (FN) information related to an FN of a graph representing the signed network, receiving neighbor node (NN) information related to a plurality of NNs in the signed network, and determining the localness measure based on the NN information and the FN information.

According to another aspect disclosed herein, a computer-implemented method is provided to determine a harmony measure that represents importance of a node connectiveness within a signed network. The method comprises, with a computer processor, receiving source node (SN) information related to an SN of a graph representing the signed network, receiving destination node (DN) information related to a DN in the signed network, and determining the harmony measure based on the SN information and the DN information.

According to another aspect disclosed herein, a system is provided to determine a node connectiveness within a signed network, comprising a memory, and a processor, wherein the processor is configured to receive source node (SN) information related to an SN of a graph representing the signed network, receive destination node (DN) information related to a DN in the signed network, and determine the harmony measure based on the SN information and the DN information.

According to another aspect disclosed herein, a system is provided to determine a localness measure that represents accessibility of a node connectiveness within a signed network. The system comprises a processor for receiving focus node (FN) information related to an FN of a graph representing the signed network, receiving neighbor node (NN) information related to a plurality of NNs in the signed network, and determining the localness measure based on the NN information and the FN information.

According to another aspect disclosed herein, a computer program product comprises instructions for a processor to implement the aspects of the method and system described above.

The computer program product contains instructions that are, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1A:
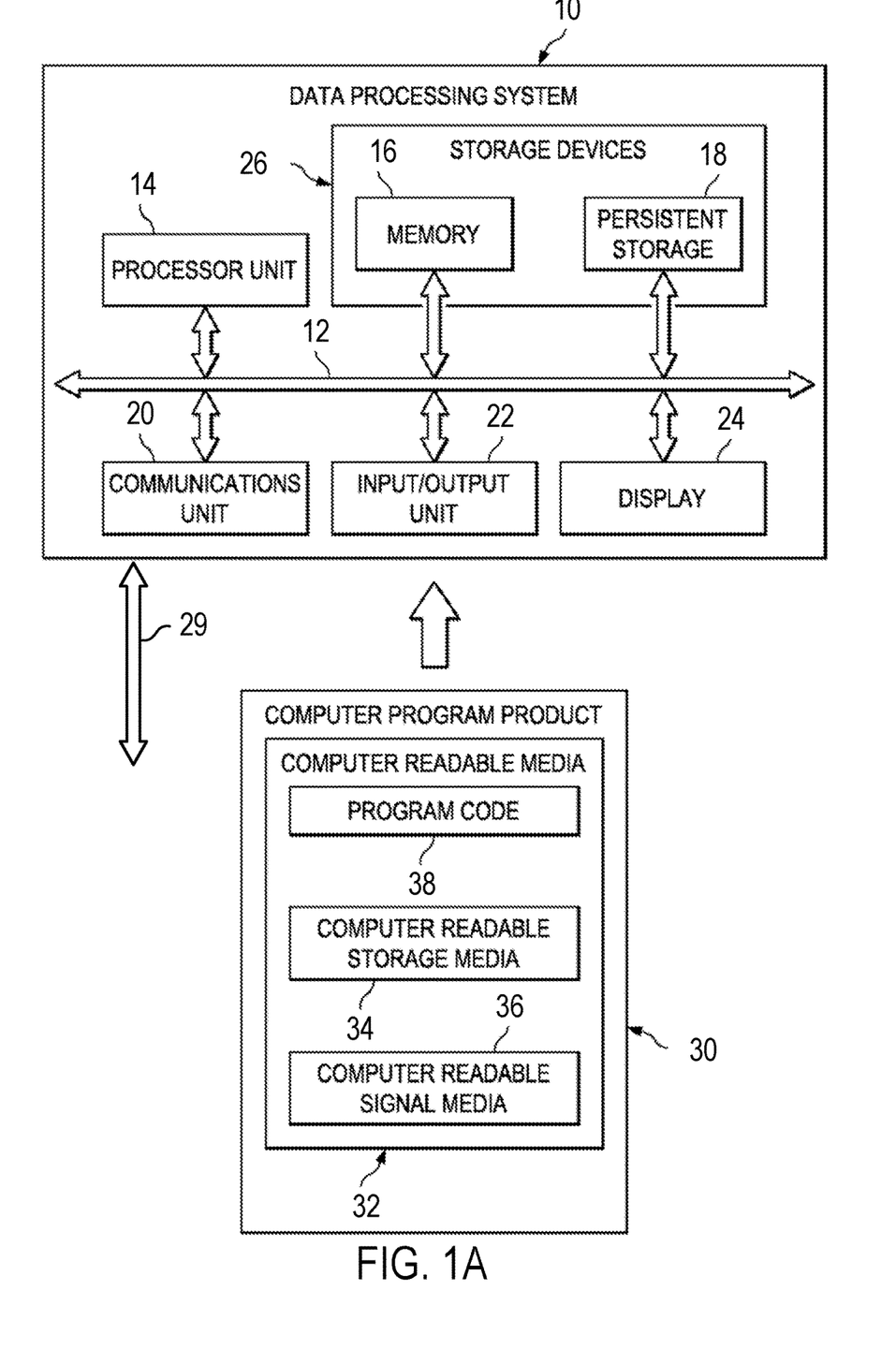
FIG. 1A is a block diagram of a data processing system (DPS) according to one or more embodiments disclosed herein.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network Data Processing System in General FIG. 1A is a block diagram of an example DPS according to one or more embodiments. In this illustrative example, the DPS 10 may include communications bus 12, which may provide communications between a processor unit 14, a memory 16, persistent storage 18, a communications unit 20, an I/O unit 22, and a display 24.

The processor unit 14 serves to execute instructions for software that may be loaded into the memory 16. The processor unit 14 may be a number of processors, a multi-core processor, or some other type of processor, depending on the particular implementation. A number, as used herein with reference to an item, means one or more items. Further, the processor unit 14 may be implemented using a number of heterogeneous processor systems in which a main processor is present with secondary processors on a single chip. As another illustrative example, the processor unit 14 may be a symmetric multi-processor system containing multiple processors of the same type.

The memory 16 and persistent storage 18 are examples of storage devices 26. A storage device may be any piece of hardware that is capable of storing information, such as, for example without limitation, data, program code in functional form, and/or other suitable information either on a temporary basis and/or a permanent basis. The memory 16, in these examples, may be, for example, a random access memory or any other suitable volatile or non-volatile storage device. The persistent storage 18 may take various forms depending on the particular implementation.

For example, the persistent storage 18 may contain one or more components or devices. For example, the persistent storage 18 may be a hard drive, a flash memory, a rewritable optical disk, a rewritable magnetic tape, or some combination of the above. The media used by the persistent storage 18 also may be removable. For example, a removable hard drive may be used for the persistent storage 18.

The communications unit 20 in these examples may provide for communications with other DPSs or devices. In these examples, the communications unit 20 is a network interface card. The communications unit 20 may provide communications through the use of either or both physical and wireless communications links.

The input/output unit 22 may allow for input and output of data with other devices that may be connected to the DPS 10. For example, the input/output unit 22 may provide a connection for user input through a keyboard, a mouse, and/or some other suitable input device. Further, the input/output unit 22 may send output to a printer. The display 24 may provide a mechanism to display information to a user.

Instructions for the operating system, applications and/or programs may be located in the storage devices 26, which are in communication with the processor unit 14 through the communications bus 12. In these illustrative examples, the instructions are in a functional form on the persistent storage 18. These instructions may be loaded into the memory 16 for execution by the processor unit 14. The processes of the different embodiments may be performed by the processor unit 14 using computer implemented instructions, which may be located in a memory, such as the memory 16. These instructions are referred to as program code 38 (described below) computer usable program code, or computer readable program code that may be read and executed by a processor in the processor unit 14. The program code in the different embodiments may be embodied on different physical or tangible computer readable media, such as the memory 16 or the persistent storage 18.

The DPS 10 may further comprise an interface for a network 29. The interface may include hardware, drivers, software, and the like to allow communications over wired and wireless networks 29 and may implement any number of communication protocols, including those, for example, at various levels of the Open Systems Interconnection (OSI) seven layer model.

FIG. 1A further illustrates a computer program product 30 that may contain the program code 38. The program code 38 may be located in a functional form on the computer readable media 32 that is selectively removable and may be loaded onto or transferred to the DPS 10 for execution by the processor unit 14. The program code 38 and computer readable media 32 may form a computer program product 30 in these examples. In one example, the computer readable media 32 may be computer readable storage media 34 or computer readable signal media 36. Computer readable storage media 34 may include, for example, an optical or magnetic disk that is inserted or placed into a drive or other device that is part of the persistent storage 18 for transfer onto a storage device, such as a hard drive, that is part of the persistent storage 18. The computer readable storage media 34 also may take the form of a persistent storage, such as a hard drive, a thumb drive, or a flash memory, that is connected to the DPS 10. In some instances, the computer readable storage media 34 may not be removable from the DPS 10.

Alternatively, the program code 38 may be transferred to the DPS 10 using the computer readable signal media 36. The computer readable signal media 36 may be, for example, a propagated data signal containing the program code 38. For example, the computer readable signal media 36 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 38 may be downloaded over a network to the persistent storage 18 from another device or DPS through the computer readable signal media 36 for use within the DPS 10. For instance, program code stored in a computer readable storage medium in a server DPS may be downloaded over a network from the server to the DPS 10. The DPS providing the program code 38 may be a server computer, a client computer, or some other device capable of storing and transmitting the program code 38.

The different components illustrated for the DPS 10 are not meant to provide architectural limitations to the manner in which different embodiments may be implemented. The different illustrative embodiments may be implemented in a DPS including components in addition to or in place of those illustrated for the DPS 10.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1B:
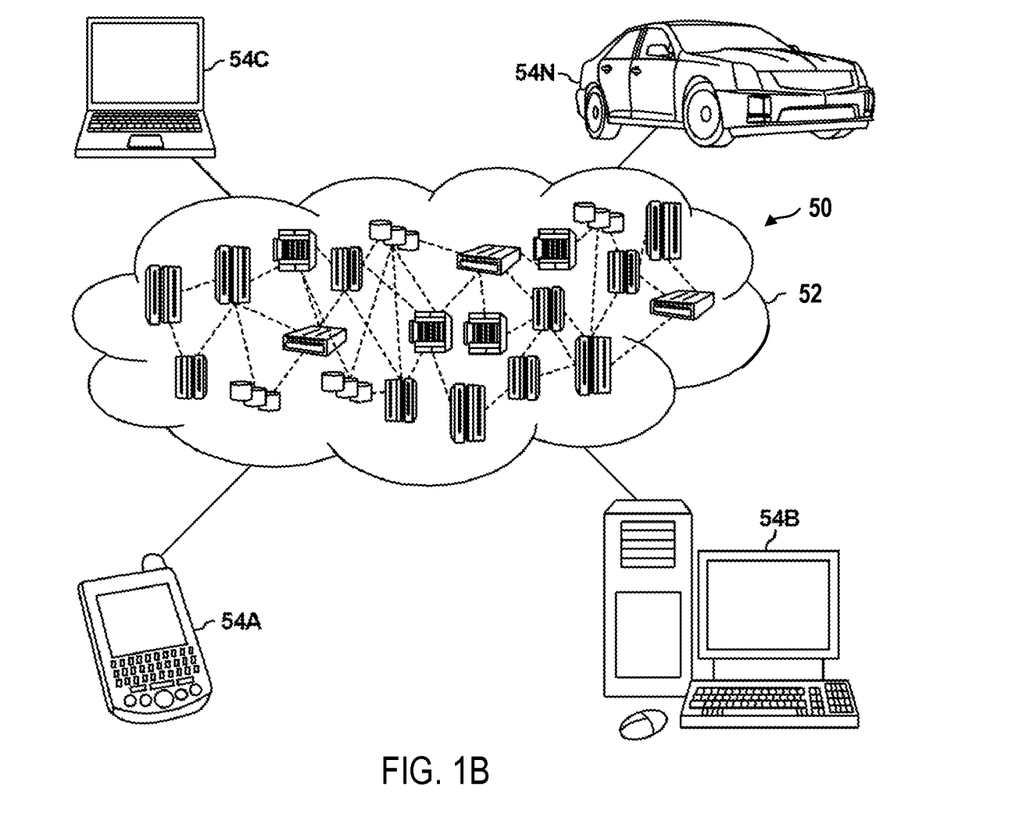
FIG. 1B is a pictorial diagram that depicts a cloud computing environment according to an embodiment disclosed herein.

Referring now to FIG. 1B, illustrative cloud computing environment 52 is depicted. As shown, cloud computing environment 52 includes one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A—N shown in FIG. 1B are intended to be illustrative only and that computing nodes 50 and cloud computing environment 52 can communicate with any type of computerized device over any type of network and/or network addressable connection (e.g., using a web browser).

Figure 1C:
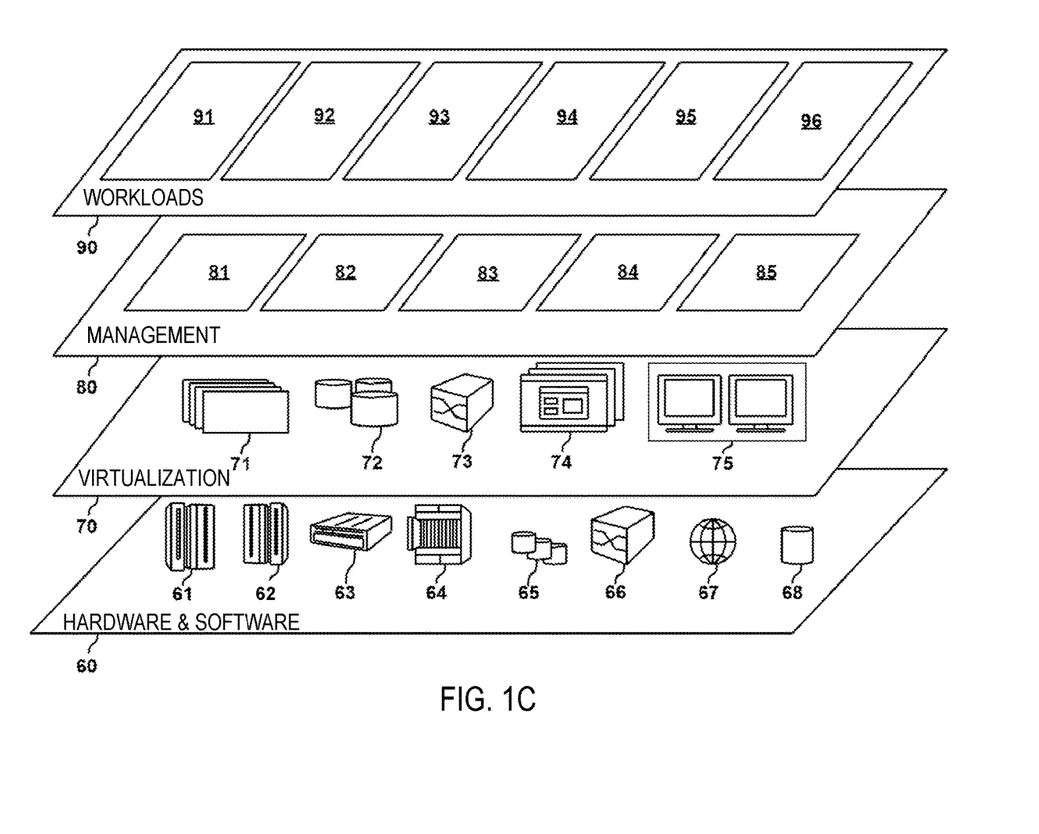
FIG. 1C is a pictorial diagram that depicts abstraction model layers according to an embodiment disclosed herein.

Referring now to FIG. 1C, a set of functional abstraction layers provided by cloud computing environment 52 (FIG. 1B) is shown. It should be understood in advance that the components, layers, and functions shown in FIG. 1C are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Any of the nodes 50 in the computing environment 52 as well as the computing devices 54A—N may be a DPS 10.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

Global and Local Measures of Centrality for Signed and Unsigned Networks

Determination of Localness

The concept of determining the localness of a node with respect to other nodes in the network has been around for a long time. Localness is intrinsic to a social network and manifests itself as clustering of nodes together. In the case of social networks, there is an assumption of non-randomness or locality. This condition may be difficult to formalize, but the intuition is that relationships tend to cluster—that is, if entity A is related to both B and C, then there is a high probability that B and C are related. The social networks may be applied to autonomous agents (such as individuals, bots, etc.).

There are several applications of computing the "localness" of a node. The most common application of finding locality of nodes in a network is in the field of distributed computing. In this field, distributed algorithms are designed such that every node of the network can deliver its result after having consulted only nodes in its vicinity. In a distributed network without shared memory, processes cooperate by exchanging messages. Since sending messages to far away nodes is expensive, computation should be based on local information as much as possible. This may be achieved by applying a locality constraint to the functions used. For example, in the case of social network analysis, the behavior of a node in the network is influenced by its close connections. In the case of information networks, the information exchange takes place at a local level.

There exist several approaches for defining locality of nodes in networks—however, they apply only to unsigned networks. In contrast, the localness measure described herein addresses the problem of computing the localness metric for signed networks, but also is generalized such that it can be applied to unsigned networks as well. Generally, the locality defined for a node in a network is formulated such that it can be used as a constraint or bounding factor in functions rather than a metric to determine the "localness" attribute of a node with respect to its neighbors. But this is addressed by first determining the neighbors of a node and then computing the localness between two nodes based on the aggregation of the edge weights (for the path connecting them), scaled down by the length of the path connecting them. There are also some methods to detect communities in signed networks as well as unsigned networks. However, the problem of detecting communities is different from that of determining the localness of a node. Community detection is similar to clustering, where similar nodes are grouped under one class/community—but it does not matter how proximal these nodes are to each other. However, for measuring the localness of a node, communities in the graph cannot be relied upon. It is important to define how accessible that node is to every other node in its vicinity.

The intuitive representation of a node's locality is its neighborhood, measured in terms of the number of hops (edges) to reach another node. However, this formulation of locality is not always appropriate for all applications. There exist several approaches for defining the locality of a node, but these metrics and measures of localness or locality are limited to unsigned networks only. It would be advantageous, in some circumstances, to provide a metric to measure the "localness" of a node for directed (edges have a direction associated with them) signed networks. Signed networks are networks that have polarities (positive or negative) associated with edges, and signed graphs are most commonly used to model social networks. As defined herein, the terms "locality" and "localness" may be used interchangeably.

A novel metric may be determined and applied to measure the localness of a node with respect to its neighborhood for signed networks. This measure considers not only the density of the subgraph (which represents a node and its local community), but also the polarity of edges (trust/positive edges and distrust/negative edges). This measure may also be applied to unsigned networks without any change in formulation. The difference in formulation of "localness" for the two most common interpretations of signed networks are discussed below.

The localness of a node reflects not only the accessibility of the node within its neighborhood, but also how well trusted that node is by its neighbors. Therefore, a node with high localness is: (a) accessible, and (b) trustworthy and/or reliable, i.e., the information received from it is authentic. This metric may hence quantify the importance of a node in terms of its local accessibility and reliability. PageRank® is a known measure to calculate the prestige or importance of a node in an unsigned graph. However, PageRank® is a global standard measure that ranks all nodes across the entire network, and provides no sense of preserving locality in this measure. The localness metric on the other hand is a local measure that is computed over a different subgraph for each node. Measuring the localness of the node concerning its neighborhood, for signed and unsigned networks, considers the density of a subgraph and the polarity of edges (trust/positive edges and distrust/negative edges). The localness of a node is based on accessibility of the node within its neighborhood and how well trusted the node is by its neighbors. A node with high localness is accessible as well as trustworthy, and/or reliable, i.e., information received from the node is authentic.

The "localness" of a node with respect to other nodes is a local measure of the graph, which means, in some embodiments, it is not calculated globally across the entire network. The localness definition, therefore, has a neighborhood constraint. This ensures that the locality measure does not consider nodes from a focus node (FN) beyond a given λ-hop distance. The λ value here, may be a predefined tunable parameter that can be changed according to the use case. Once the λ-hop neighborhood of a given node is defined, a subgraph may be induced over these neighboring nodes (NNs). All subsequent calculations may then take place over this induced subgraph.

The localness of a node (i) over a given neighborhood (λ) may be determined in the following manner: for each node (n) in this neighborhood λ, all the paths between a particular node i and the node n may be considered. The length of each path shows how many hops it would take to reach node n from node i. The farther away node n is from node i, the lesser the localness of node i is with respect to node n. Hence, the localness of node i with respect to node n is inversely proportional to the length of the path between the two nodes.

Although centrality measures, such as the closeness centrality and harmonic centrality, are also measured using path lengths, these centrality measures differ from the localness measure discussed herein for the following reasons: (a) localness is not solely dependent on path length, whereas the two centrality measures are—localness also depends on the edge weights and the polarities; (b) both centrality measures are standard, global measures, whereas the localness measure may be a tunable metric—it may be changed by changing the λ values (i.e., the neighborhood extent).

The density of the induced subgraph may be considered while computing the localness measure. This is relevant because the computation weighs subgraphs with low or high density accordingly. The density of the subgraph is measured using a clustering co-efficient, defined below, which is basically the proportion of the number of edges in the subgraph to the total number of edges that would have been present if the subgraph were fully connected.

The weights of the node edges signify the intensity of the negative/positive edges. For example, in the case of trust-distrust networks, the weight of an edge would represent the extent to which a node either trusts (positive) or distrusts (negative) the other node. These edge weights, therefore, play a substantive role in determining the localness of a node. The way these edge weights (whether sum or product) are aggregated depends on the interpretation of the edge weights in the network. Broadly, the signed graph may be interpreted in two different ways, which are described below, as are definitions of the localness metric for both of these interpretations.

By way of example, a signed network graph (G) has directed edges with either positive or negative edge weights. The signed edges in the graph can be interpreted in two ways as follows. The two interpretations of signed networks are: (a) an expression of trust or distrust by a source node towards a destination node; and (b) the possibility of information propagation by the destination node to the source node and the fidelity or veracity of the propagated information. In some implementations, the proper application is determined based on the context of the problem. However, for any application, both the localness and harmony measures may be calculated for a given interpretation.

Figure 2A:
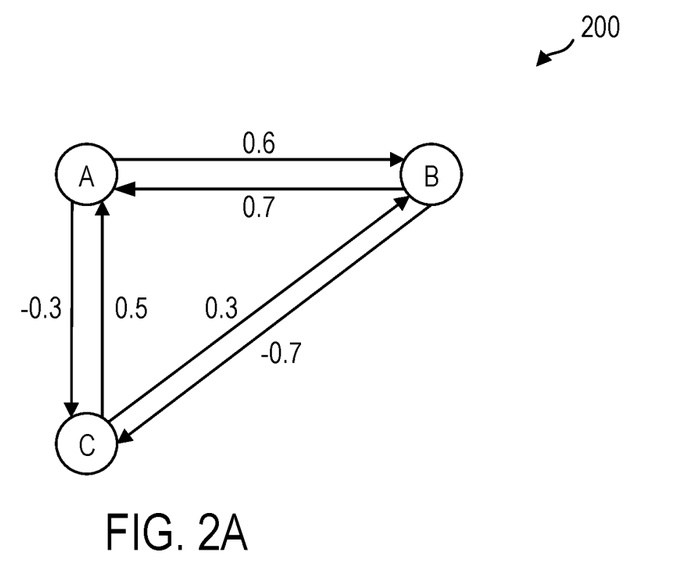
FIGS. 2A and 2B are block diagrams illustrating signed networks, according to some implementations.
Figure 2B:
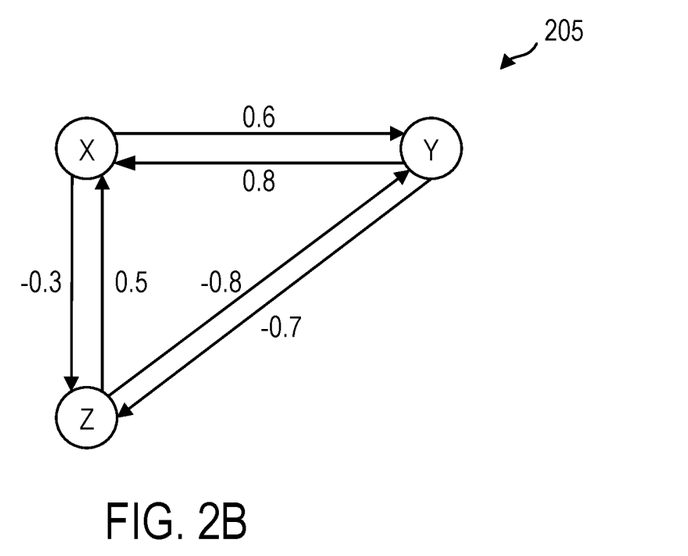

FIGS. 2A and 2B provide representative illustrations. A positive value signifies an extent of trust in the trust-distrust interpretation, and a fraction of truth propagated in the information propagation interpretation. A negative value signifies an extent of distrust in the trust-distrust interpretation, and an extent of distortion of information propagated in the information propagation interpretation. By way of example, in graph 200 of FIG. 2A, according to interpretation (a) (trust-distrust), node A trusts node B to the extent of 60% and distrusts node C to the extent of 30%. In graph 205 of FIG. 2B, according to interpretation (b) (information propagation), node X is assumed to have propagated 60% of the ground truth to node Y; this may be due to node X's own beliefs and biases. According to interpretation (b), the edge from node X to node Z with a weight of −0.3 can be seen as node X distorting 30% of the information (by omitting the truth and adding untruth in its place) it propagates to node Z. Such a measure could represent, e.g., how many of a list of facts are incorrect from some total. The difference between these two interpretations is that, in case of trust and distrust edges, a product of the edge weights (including the sign) is taken. This means that two negative (distrust) edges would result in a positive product (trust). This analogous with the interpretation that an enemy of an enemy is a friend. In the other interpretation, the concern relates to the piece of information that is ultimately received by the sink (end, or information consuming) node. In this case, a summation (instead of a product) is taken because it is desirable to have the information to undergo all the modifications on the way, in an additive manner.

Figure 3A:
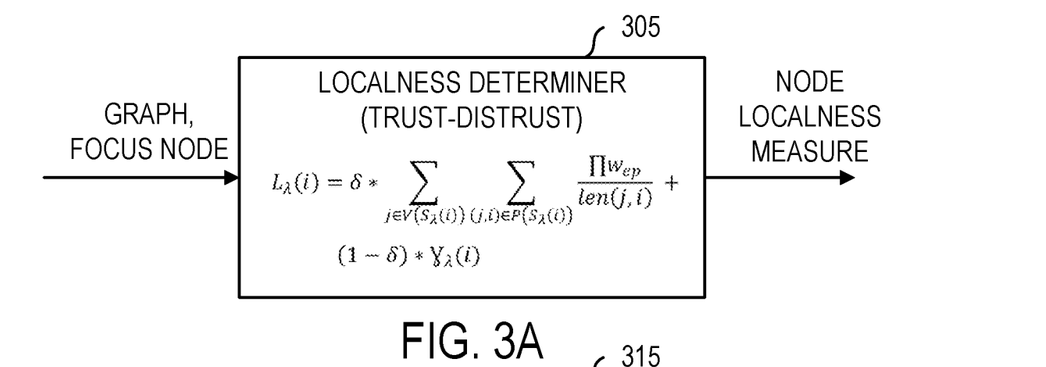
FIGS. 3A, 3B, 3C, and 3D are block diagrams illustrating entities to calculate the localness and the harmony measures, according to some implementations.
Figure 3B:
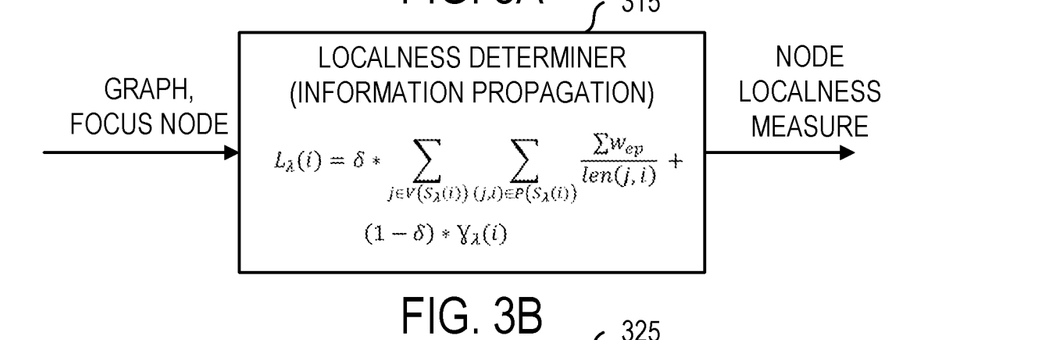

The localness definition then becomes, under each interpretation (and as reflected in FIGS. 3A and 3B):

a) Trust-distrust interpretation (FIG. 3A, localness determiner 305):

Localness, L of node i over λ hop neighborhood of i:

$$L_\lambda(i) = \delta * \sum_{j \in V(S_\lambda(i))} \sum_{(j,i) \in P(S_\lambda(i))} \frac{\prod w_{ep}}{len(j, i)} + (1 - \delta) * Y_\lambda(i)$$

b) Information propagation interpretation (FIG. 3B, localness determiner 315):

Localness, L of node i over λ hop neighborhood of i:

$$L_\lambda(i) = \delta * \sum_{j \in V(S_\lambda(i))} \sum_{(j,i) \in P(S_\lambda(i))} \frac{\sum w_{ep}}{len(j, i)} + (1 - \delta) * Y_\lambda(i)$$

c) Clustering co-efficient measure for both of the interpretations:

$$Y_\lambda(i) = \frac{\sum_{(k,j) \in E(S_\lambda(i))} w_{kj}}{|V(S_\lambda(i))| * (|V(S_\lambda(i))| - 1)}$$

Such that k≠i & j≠i

Y =Weighted clustering coefficient of the induced subgraph i=Node under consideration λ=Neighborhood hop for the induced subgraph $S_\lambda(i)$=Induced subgraph over the $\lambda$ hop neighborhood of i V=Set of all vertices of $S_\lambda(i)$
P=Set of all paths of $S_\lambda(i)$
j=Vertex in $S_\lambda(i)$ such that j≠i
k=Vertex in $S_\lambda(i)$ such that k≠i
E=Set of all edges of $S_\lambda(i)$
$\Pi w_{ep}$=Product of all edges for a path in P
$\Sigma w_{ep}$=Sum of all edges for a path in P Here, $\lambda$ may be a tunable parameter, which may be used to increase or decrease the spread of the neighborhood in consideration; $\delta$ may also be a tunable parameter in the interval [0, 1], which helps determine the emphasis to be laid on the weighted clustering coefficient.

This formulation of localness for directed signed networks may be generalized and used for undirected signed networks as well as directed/undirected unsigned networks. This localness measure may have various applications, one of which is to mine hierarchies in a signed network. The localness measure may then be used as one of the parameters based on which to elect a parent node from a plurality of contender parent nodes to create the hierarchy. This would be based on the premise that a parent should be (relatively) "local" enough to its child to adequately represent the child node, or act as a leader of the child node. Among the contender parent nodes, the node with the largest score may be assigned as the parent or local representative. Example applications for the localness measure may include, among other things, selecting a local representative node among a cluster of distributed computing agents. This will help one agent to be elected as representative or "point of contact" for that cluster, through which external agents may communicate with the cluster.

Harmony: A Measure of Global Connectedness of Nodes in Signed and Unsigned Networks Related to the measure of localness of nodes, discussed above, in large sized social or information networks, the importance of nodes needs to be measured both at a local and global level for signed and unsigned networks. This connectedness helps to determine the extent to which a node is responsible for establishing trust linkages across pairs of nodes. The local importance of a node signifies its role or influence in its (small) neighborhood. The global importance of a node is an indicator of the role played or influence exerted by the node across the expanse of the network. For instance, if the network is a social network where edges signify trust/distrust between nodes, the global importance of a node could be measured by determining how many (long) chains of trust containing that node exist in the network. This would underpin the significance of the node in communication or information propagation across the network. A similar argument holds in the case of information networks as well. Existing measures of centrality may partially address this problem; however, they are restricted to unsigned networks.

There are a variety of applications where finding the most important influencer in a network provides significant insights about a network. Examples of these applications include finding the most influential entity (e.g., person, business, etc.) in a network, and include PageRank® for finding the relative importance of webpages in a network, finding key infrastructure nodes in the Internet or urban networks, mining hierarchies of a network, etc. There are various kinds of centrality measures, like degree centrality, betweenness centrality, eigenvector centrality, such as PageRank®, etc. With the exception of eigenvector centrality, they are all defined largely for unsigned networks. Eigenvector centrality is a recursively defined concept in which a node connected to many central nodes also has a high centrality. The concepts defined herein separate the local and global measures of centrality to determine the kind of influence nodes exercise in the network.

Adding signs to the edges of networks calls for defining new measures of centrality which can handle the context of signed networks. In signed networks the signs on the edges of the graph can have various interpretations like trust or distrust between the nodes, correctness or incorrectness of information propagated within the nodes etc.

A new measure of centrality, referred to herein as "harmony", addresses the issue of signed networks and is described below. The focus of the harmony metric is to determine the extent to which a node is responsible for establishing trust linkages across pairs of nodes in the entire network. Although eigenvector centralities have been defined for signed networks, the harmony metric provides a novel measure of centrality that quantifies the importance of a node in terms of its ability to connect long chains of trust in a signed network.

As noted above with the localness determination, the two interpretations of the signed networks are: (a) an expression of trust or distrust by a source node towards a destination node; and (b) the possibility of information propagation by the destination node to the source node and the fidelity or veracity of the propagated information. A high harmony score implies that a node is important in enabling communication/providing accessibility to the other nodes that are connected through it. The harmony measure may be used to detect the "importance" of the nodes in the network for the above two mentioned interpretations.

The formulation of the measure in each interpretation is different. For the trust-distrust interpretation, one of the factors considered is the ratio of the viable paths to the total number of paths (i.e., viable paths+inviable paths) containing the node under consideration. A path is considered viable if the product of all edges on the path is positive and inviable otherwise. If the product of the signs on consecutive edges in a path is positive, it bears the same notion as "a friend of a friend is a friend" across multiple hops; the path is then called viable. Similarly, if the product is negative, then the path is inviable because the path is host to a foe relationship that restricts the reliable flow of information through it; this is similar to the notion "a friend of a foe is a foe" or "a foe of a friend is a foe".

The magnitude of the weights represents the extent of friendship and foeship. Given a pair of nodes (i.e., source and destination), the length of the shortest paths on which the node under consideration lies are considered. The notion here is that nodes which are parts of bigger chains can exert greater influence in propagating trust and distrust in the networks because of their superior reach in the network.

For the information propagation interpretation, the sum of the edge weights is considered in the formulation, with emphasis on the cumulative information propagated on the shortest path the node under consideration lies on. Here, a positive sign on an edge represents that there is some correctness to the information propagated through that link and a negative sign represents that there is incorrectness in the information propagated through that link, although the determinations as to how correctness and incorrectness are determined is a topic beyond the disclosure presented here. The magnitude of weights represents the extent of correctness and incorrectness over those links. The length is not considered in the network since the total information propagated is of interest. Along with that, the position of the node in the shortest paths it lies on is considered. The understanding here is that if a node is more central in that path, it exerts more influence compared to if it were at the beginning or the end of the chain. This is considered in both of the interpretations.

The "harmony" metric of a node provides the extent to which a node is responsible in connecting long chains of trust across pairs of nodes in the network. A high harmony score implies that this node is significant in enabling communication/providing accessibility to the other nodes that are connected through it.

Figure 3C:
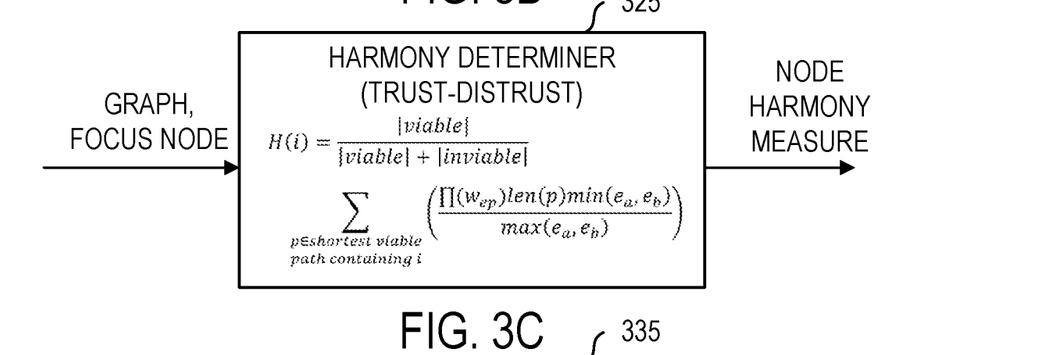

As before, consider a graph (G) on which mining hierarchies is of interest. For the trust-distrust interpretation, and as illustrated in FIG. 3C, harmony determiner 325, the computation is:

Harmony H for node i:

$$H(i) = \frac{|viable|}{|viable| + |inviable|} \sum_{\substack{p \in shortest\ viable \\ path\ containing\ i}} \left( \frac{\prod (w_{ep}) len(p) \min(e_a, e_b)}{\max(e_a, e_b)} \right)$$

Figure 3D:
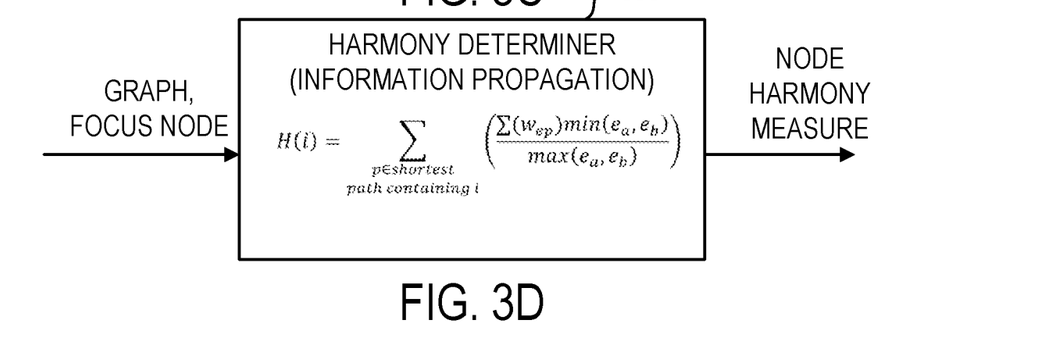

Here, a path is defined as viable if the product of all edge weights on that path is positive, i.e., $\Pi w_{ep} > 0$; otherwise the path is inviable. The variables are defined as follows:
p=viable shortest path containing i
$e_a$=count of number of edges on p after encountering i
$e_b$=count of number of edges on p before encountering i For the information propagation interpretation, the computation is (FIG. 3D, harmony determiner 335):

Harmony H for node i:

$$H(i) = \sum_{\substack{p \in shortest \\ path\ containing\ i}} \left( \frac{\sum (w_{ep}) \min(e_a, e_b)}{\max(e_a, e_b)} \right)$$

where,
p=shortest path containing i
$e_a$=count of number of edges on p after encountering i
$e_b$=count of number of edges on p before encountering i The localness determiners 305, 315, may be executed on a DPS 10. The harmony determiners 325, 335 may be executed on a DPS 10 as well. When a cloud architecture is used, these all may be implemented as cloud computing nodes 50 within the cloud computing environment 52.

Figure 4:
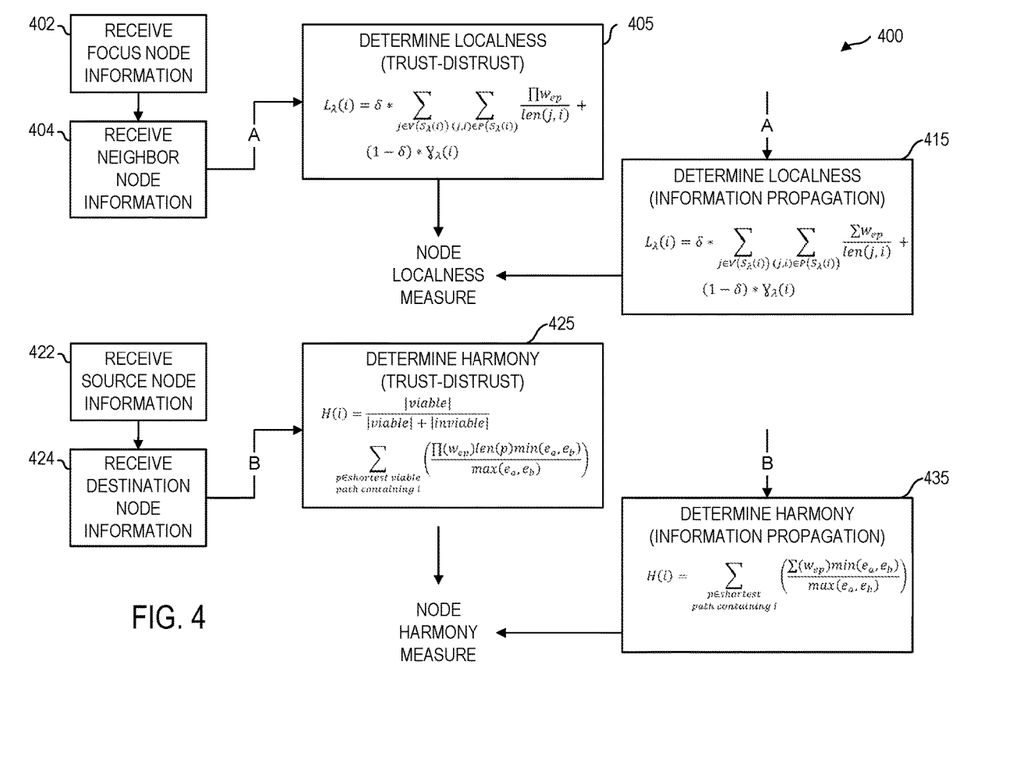
FIG. 4 is a flowchart illustrating a process of determining both the localness measure and the harmony measure, each under a trust-distrust interpretation and an information propagation interpretation.

FIG. 4 is a flowchart of a process 400 capturing certain elements as described with respect to FIGS. 3A-D. In operation 402, the localness determiner 305, 315 receives the information about the focus node, including its location and/or other attributes within the network. In operation 404, the localness determiner 305, 315 receives the neighbor node information, which may constitute information about nodes in the local neighborhood that are defined, e.g., as being a predefined number of hops away from the focus node. In operation 405, the localness determiner 305 for a trust-distrust implementation produces the node localness measure according to the formulation in operation block 405. In operation 415, the localness determiner 315 for an information propagation implementation produces the node localness measure according to the formulation in operation block 415.

In operation 422, the harmony determiner 325, 335 receives the information about the source node, including its location and/or other attributes within the network. In operation 424, the harmony determiner 325, 335 receives the destination node information, which may constitute information about nodes both locally (to the source node) and globally (throughout the network/graph). In operation 425, the harmony determiner 325 for a trust-distrust implementation produces the node harmony measure according to the formulation in operation block 425. In operation 435, the harmony determiner 335 for an information propagation implementation produces the node harmony measure according to the formulation in operation block 435.

Use Case: Application in Cloud Computing Systems

In general, distributed computing systems, including cloud computing platforms, follow variants of either a primary-secondary architecture or a peer-to-peer architecture. In primary-secondary architectures, the primary node controls the transmission of information to the secondary nodes and acts as a hub for communication with the external world. For example, in a distributed database in a cloud environment, the primary node is responsible for serving data write requests as well as serving data read requests, while the secondary nodes are responsible for serving read requests alone. In a peer-to-peer setup, all the nodes are responsible for serving writes as well as reads. Replication of data takes place by transmission of data from nodes that receive the writes to a subset of the other nodes.

In primary-secondary architectures, when the primary node fails or goes down, a leader election algorithm is typically used to elect a new primary. A cloud computing cluster consists of several nodes (computers/servers) distributed across several geographies. Consider, in the use case, a distributed database cluster spread across one-hundred nodes (computers/servers) and five geographies, with twenty nodes per geography. Assume that each set of twenty nodes pertaining to a geography represents a partition of a shard or replica set of the database. In this context, the problem of electing a leader may be reduced to identifying the node with the highest localness in the neighborhood spanning these twenty nodes. As noted above, the notion of localness is based on the trust/distrust accrued by nodes and their accessibility within the neighborhood.

Now, assuming a peer-to-peer architecture for a distributed database cluster spread across one-hundred nodes (computers/servers) and five geographies, with twenty nodes per geography. In theory, an application can make data write requests or data read requests to any of the nodes in this cluster regardless of geography. However, network communication costs can render these requests prohibitively expensive. Therefore, it may be necessary for applications to choose the nodes such that the cost is optimized against the benefit of having their requests served. For instance, an application running on a node in Europe would be better served (for reads as well as writes) by data nodes in Europe due to lower costs. The same request can be served by data nodes in North America as well but at a higher cost (communication costs are higher due to the distances). Here too, the notion of localness may be used to determine the most optimal node to which the application can make read/write requests.

The example above shows that the localness of data nodes to application nodes in the cloud minimizes the cost incurred by the application node in making the data read/write requests. It also minimizes the network transmission costs for replicating data writes in (or fetching data from) other data nodes in the same neighborhood/geography. However, it does not take into account the network transmission costs of replicating data writes in (or fetching data from) data nodes residing in faraway geographies. For example, while the application running on a node in Europe making read/write requests based on localness optimizes overall network costs in the same geography, it does not optimize network costs if the read/write requests need to be made to data nodes located in North America. Such a scenario is plausible given that the data is shared across geographies and may need to be fetched from faraway nodes. Similarly, data may need to be replicated in faraway nodes in the case of write requests. In such cases, the application node can determine the most optimal data node to which to make requests based on the measure of harmony. Making read/write requests based on harmony may allow the network to globally replicate data regardless of geography. Making read/write requests based on a combination of harmony and localness may allow the network to replicate data within the local geography of the application node as well as globally across the network. Making requests based on localness may allow the network to optimize replication within the local geography of the application node regardless of the global transmission costs.

Technical Application

The one or more embodiments disclosed herein accordingly provide an improvement to computer technology. For example, an improvement to a computer-based network of nodes to determine a localness and harmony metric may help to improve the flow of information throughout the network.

Computer Readable Media

The present invention may be a system, a method, and/or a computer readable media at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for determining a localness measure that represents accessibility of a node connectiveness within a signed network, the method comprising, with a computer processor:
   receiving focus node (FN) information related to an FN of a graph representing the signed network;
   receiving neighbor node (NN) information related to a plurality of NNs in the signed network; and
   determining the localness measure based on the NN information and the FN information; wherein:
   the NNs extend only to a $\lambda$-hop distance from the FN in a $\lambda$-hop neighborhood of the FN;
   $\lambda$ is a predefined tunable parameter; and
   the determining of the localness measure is based on:
   a) an aggregation of signed node edge weights of a path connecting the FN and the NNs, the FN and the NNs defining a subgraph; and
   b) scaling down the aggregation, based on a path length of the path.

2. The method of claim 1, further comprising determining the NNs based on the FN information.

3. The method of claim 1, wherein the localness measure is based on a density of the subgraph.

4. The method of claim 1, further comprising, for a trust-distrust interpretation type, determining the localness measure of the FN (i) over the $\lambda$-hop neighborhood to be:

$$L_\lambda(i) = \delta * \sum_{j \in V(S_\lambda(i))} \sum_{(j,i) \in P(S_\lambda(i))} \frac{\prod w_{ep}}{len(j, i)} + (1 - \delta) * Y_\lambda(i)$$

wherein the clustering coefficient measure is:

$$Y_\lambda(i) = \frac{\sum_{(k,j) \in E(S_\lambda(i))} w_{kj}}{|V(S_\lambda(i))| * (|V(S_\lambda(i))| - 1)}$$

Such that k≠i & j≠i
Y=Weighted clustering coefficient of the induced subgraph
i=Node under consideration
$\lambda$=Neighborhood hop for the induced subgraph
$S_\lambda(i)$=Induced subgraph over the $\lambda$ hop neighborhood of i
V=Set of all vertices of $S_\lambda(i)$
P=Set of all paths of $S_\lambda(i)$
j=Vertex in $S_\lambda(i)$ such that j≠i
k=Vertex in $S_\lambda(i)$ such that k≠i
E=Set of all edges of $S_\lambda(i)$
$\Pi_{wep}$=Product of all edges for a path in P
$\Sigma_{wep}$=Sum of all edges for a path in P; and
wherein:
$\lambda$ is a tunable parameter, used to increase or decrease the spread of the neighborhood in consideration; and
$\delta$ is a tunable parameter in the interval [0, 1], which helps determine an emphasis applied to the weighted clustering coefficient.

5. The method of claim 1, further comprising, for an information propagation interpretation type:
determining the localness measure of the FN (i) over the $\lambda$-hop neighborhood to be:

$$L_\lambda(i) = \delta * \sum_{j \in V(S_\lambda(i))} \sum_{(j,i) \in P(S_\lambda(i))} \frac{\prod w_{ep}}{len(j, i)} + (1 - \delta) * Y_\lambda(i)$$

wherein the clustering coefficient measure is:

$$Y_\lambda(i) = \frac{\sum_{(k,j) \in E(S_\lambda(i))} w_{kj}}{|V(S_\lambda(i))| * (|V(S_\lambda(i))| - 1)}$$

Such that k≠i & j≠i
Y=Weighted clustering coefficient of the induced subgraph
i=Node under consideration
$\lambda$=Neighborhood hop for the induced subgraph
$S_\lambda(i)$=Induced subgraph over the $\lambda$ hop neighborhood of i
V=Set of all vertices of $S_\lambda(i)$
P=Set of all paths of $S_\lambda(i)$
j=Vertex in $S_\lambda(i)$ such that j≠i
k=Vertex in $S_\lambda(i)$ such that k≠i
E=Set of all edges of $S_\lambda(i)$
$\Pi_{wep}$=Product of all edges for a path in P
$\Sigma_{wep}$=Sum of all edges for a path in P; and
wherein:
$\lambda$ is a tunable parameter, used to increase or decrease the spread of the neighborhood in consideration; and
$\delta$ is a tunable parameter in the interval [0, 1], which helps determine an emphasis applied to the weighted clustering coefficient.

6. The method of claim 1, further comprising:
selecting a local representative node among a cluster of distributed computing agents utilizing the localness measure; and
communicating with external agents through the cluster via the local representative node.

7. A method for determining a localness measure that represents accessibility of a node connectiveness within a signed network, the method comprising, with a computer processor:
receiving focus node (FN) information related to an FN of a graph representing the signed network;
receiving neighbor node (NN) information related to a plurality of NNs in the signed network;

determining the localness measure based on the NN information and the FN information;

determining the localness measure for each of a plurality of contender parent nodes in the signed network; and electing a parent node from the plurality of contender parent nodes based on the respective localness measures of the contender parent nodes to create a node hierarchy in the signed network.

8. A method for determining a harmony measure that represents importance of a node connectiveness within a signed network, the method comprising, with a computer processor:

receiving source node (SN) information related to an SN of a graph representing the signed network;

receiving destination node (DN) information related to a DN in the signed network; and determining the harmony measure based on the SN information and the DN information;

wherein:

for a trust-distrust interpretation:

the determining of the harmony measure is based in part on a ratio of a number of viable paths between the SN and the DN to a number of total paths between the SN and the DN, wherein each viable path is one where a product of all edge weights on the path is positive; and the harmony measure is further based in part on a on a quantity of weights associated with nodes in a shortest path between the SN and the DN.

9. The method of claim 8, wherein the harmony measure H(i) is determined to be:

$$H(i) = \frac{|viable|}{|viable| + |inviable|} \sum_{p \in shortest\ viable\ path\ containing\ i} \left( \frac{\prod (w_{ep}) len(p) \min(e_a, e_b)}{\max(e_a, e_b)} \right)$$

where:

a path is defined as viable conditioned upon the product of all edge weights on that path being positive ($\Pi w_{ep} > 0$), and otherwise the path is defined as inviable;

p = viable shortest path containing i;

$e_a$ = count of number of edges on p after encountering i; and $e_b$ = count of number of edges on p before encountering i.

10. The method of claim 8, wherein, for an information propagation interpretation:

the determining of the harmony measure is based in part on a sum of all node edge weights of nodes in a shortest path between the SN and the DN.

11. The method of claim 10, wherein the node edge weights represent an extent of information correctness.

12. The method of claim 10, wherein the harmony measure H(i) is determined to be:

$$H(i) = \sum_{p \in shortest\ path\ containing\ i} \left( \frac{\sum (w_{ep}) \min(e_a, e_b)}{\max(e_a, e_b)} \right)$$

wherein p = shortest path containing i;

$e_a$ = count of number of edges on p after encountering i; and $e_b$ = count of number of edges on p before encountering i.

* * * * *